United States Patent [19]
Christensen

[11] 3,874,489
[45] Apr. 1, 1975

[54] GLASS ROD AND REEL CONSTRUCTION

[75] Inventor: Don C. Christensen, Granger, Utah

[73] Assignee: George E. Baumann, Salt Lake City, Utah ; a part interest

[22] Filed: July 13, 1973

[21] Appl. No.: 379,165

[52] U.S. Cl........ 191/12.2 R, 174/122 G, 242/54 R
[51] Int. Cl............................................. H01r 39/00
[58] Field of Search...................... 191/12.2 R, 12.4; 174/122 G, DIG. 4, 120 C, 120 SR; 239/198, 199; 242/54 R; 254/150, 186 R

[56] References Cited
UNITED STATES PATENTS

| | | | |
|---|---|---|---|
| 1,165,277 | 12/1915 | Munson | 239/199 UX |
| 2,977,427 | 3/1961 | Benjamin | 191/12.2 R |
| 3,032,616 | 5/1962 | Harrington | 191/12.2 R |
| 3,676,614 | 7/1972 | Garmong | 191/12.2 R |

FOREIGN PATENTS OR APPLICATIONS 612,736　11/1948　United Kingdom............. 174/122 G

*Primary Examiner*—Lloyd L. King
*Assistant Examiner*—Michael Mar

[57] ABSTRACT

A reel-type storage structure for elongate structures such as Fiberglas, or "glass" rods, and, in addition, to glass rods incorporating electrical leads, for probe test or other purposes. The subject glass rod includes spaced, elongate, electrical conductors; means are provided for connecting these electrical conductors to a brush system of the storage reel. The brush system in turn is provided with electrical cable means leading to external connection. The glass rod may incorporate heating elements for connection, probes or various natures, and so forth. The invention also comprehends the basic concept of storing glass rod in rolled form on a reel.

6 Claims, 4 Drawing Figures

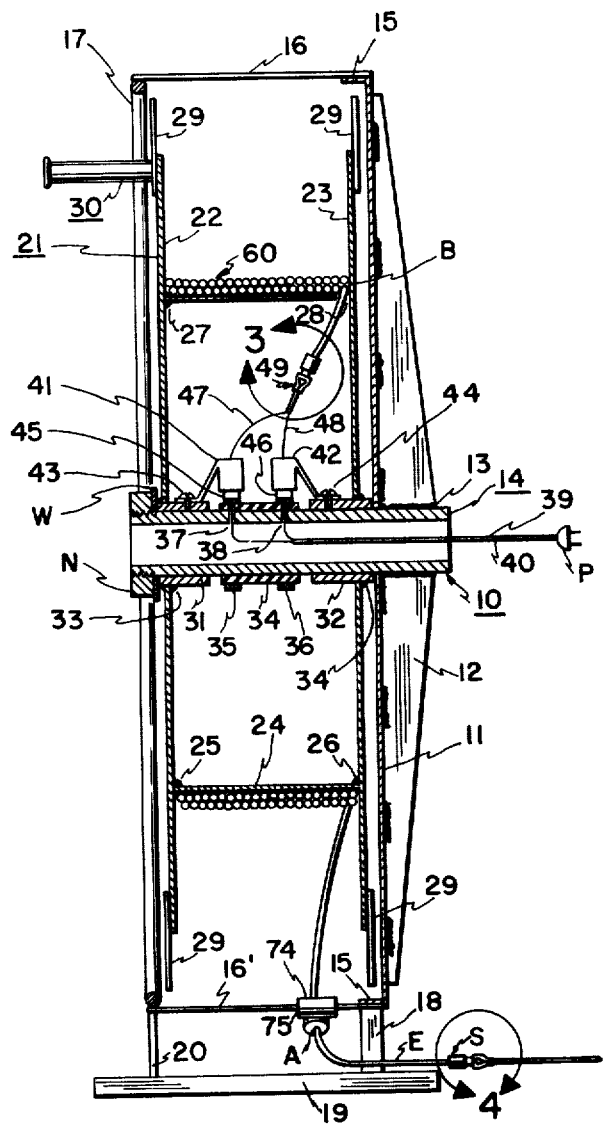
FIG. 2
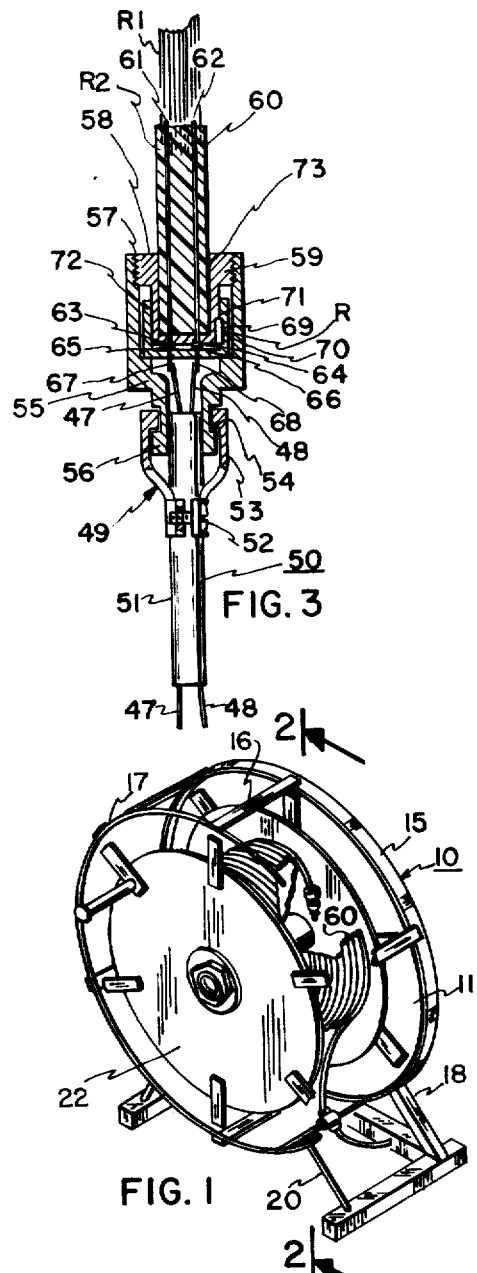
FIG. 3
FIG. 1
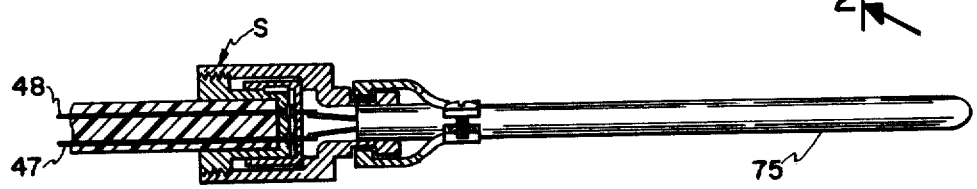
FIG. 4

GLASS ROD AND REEL CONSTRUCTION

The present invention relates to storage reels, glass rod to be contained thereon, and improvements in the same and, more particularly, to a new and improved glass rod storage reel that can be utilized for storing glass rods containing electrical leads.

As used herein, "glass" rod shall refer to rods made through resin impregnation of selected glass roving, as in "Fiberglas" materials and processes.

In the past, there has been difficulty in storing any type of glass rod. By glass rod is simply ment a Fiberglas rod of quarter inch diameter, by way of example, wherein a given number of end rovings are used and are saturated or held together with some type of polyester resin system for producing the completed object.

The present invention comprehends such rod as well as such rod incorporating electrical lead means.

In the present invention the glass rod contemplated includes one or more electrical leads imbedded in the glass rod. Where two or more leads are utilized, then the rod itself serves as an insulation medium between the electrical leads employed.

The reel of the present invention is easily wound, by hand or machine, and in any event may include electrical means by which the leads of the glass rod can be connected to an external electrical circuit. Additionally, the rod is provided with end connection equipment permitting a swiveling connection and still a maintaining of electrical conduction between the leads of the glass rod and any external equipment or circuitry. In the invention the glass rod is kept in its rolled form and is constrained against expanding outwardly from the reel by means of transverse straps that are part of a fixed reel structure encasing the revolving reel proper. The latter is suitably journaled by bearings that revolve on a fixed shaft supported by the stationary frame structure reel.

Accordingly, a principal object of the present invention is to provide a new and improved revolvable reel structure.

An additional object is to provide a revolvable reel structure having means for electrically connecting to cable wound upon such reel.

An additional object is to provide a reel structure suitable for encasing glass rods.

An additional object is to provide elongate, glass rod structure including one or more encased electrical leads therein.

An additional object is to provide a revolvable reel structure in combination with or usable with glass rods including electrical leads.

A further object is to provide a reel having electrical means for connecting electrical leads of the glass rod to an external circuit.

A further object is to provide a combination glass rod and reel structure which can be used for a number of purposes as for example, for heating, fishing lines, examining telephone cable chamber leaks, and for other and very important uses.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of a reel structure constructed in accordance with the principles of the present invention in a preferred embodiment thereof.

FIG. 2 is a transverse vertical section of the reel of FIG. 1 taken along the line 2—2.

FIG. 3 is an enlarged, sectional detail taken along the arcuate arrow three in FIG. 2, illustrating a connection of the electrical leads to the reel to the electrical conductors of the cable or rod.

FIG. 4 is similar to FIG. 3 but is taken along the arcuate arrow four in FIG. 2, illustrating a connection of the rod to a probe or other sensing element, by way of example.

In FIGS. 1 and 2, stationary frame 10 is shown to include a circular side member or disk 11 provided with a series of welded stiffener reinforcing ribs 12 that extend radially outwardly as indicated. The inner surfaces 13 of each of these ribs is welded to a stationary shaft 14. Member 11 includes a peripheral lip 15 to which is welded a series of supporting straps 16, one of which is shown, which are welded to and support outer ring 17. A series of legs 18, and 20 are welded to the combination of the lower straps 16 and member 11, at the lower portion of lip 15, this so as to accommodate the provision of reel base members 19. Additional legs 18, and 20 are supplied so as to complete a secure reel base support structure.

Revolvable reel 21 is composed of disc-configured side members 22 and 23 which are secured together in mutually spaced relationship by a cylindrical drum member 24. Drum member 24 may be welded in place at welds 25, 26, 27, and proximate 28. A series of fingers 29 extend radially outwardly and are welded or otherwise secured to the disc-shaped side members 22 and 23. The purpose for these fingers is to retain the role of glass rod 60, hereinafter described, upon the reel proper so that the same will not tend to spill outwardly in the direction of the reel handle 30, by way of example. Cylindrical bearings 31 and 32 are respectively welded at 33 and 34 to the respective side members 22 and 23 of reel 21. This provides for the journaling of the reel to the stationary shaft 14. Cylindrical insulation mount 34 is fixedly disposed as by cementing, medially upon shaft 14, and includes electrically conductuve rings 35 and 36 as indicated. Apertures 37 and 38 are provided through the shaft and the insulation ring 34, as to accommodate the leads 39 and 40 which respectively lead to the circular conductive strips or rings 35 and 36. Brush holders 41 and 42 are respectively secured, by screw attachments 43 and 44, to the bearings 31 and 32 as before described. These brush holders include the conventional, spring-biased electrical wiper brushes 45 and 46 which engage the stationary rings 35 and 36. Leads 47 and 48 are electrically connected to the brushes in the conventional manner and lead to connector structure 49. Connector structure 49 is detailed in FIG. 3. Thus, the electrical leads 47 and 48 comprise leads of an electric cord 50 having insulated casing 51. The electrical cord 50 is provided with a cord clamp 52 having an enlarged end 53 provided with retension shoulder 54. Connector 55 includes an enlarged end 56 which is disposed proximate such shoulder, and the former likewise has a threaded end at 57 threadedly engaging portion 58 of glass rod cap 59. Glass rod 60 in this embodiment includes a pair of bare, non-insulated wires 61 and 62 which lead to engagement buttons 63 and 64. These buttons are brought into engagement with corresponding electrical buttons or contacts 65 and 66, connecting to fingers 67 and 68. Connector 67 and 68 connect directly as by soldering to wires 47 and 48 as seen in the middle portion of FIG. 3. An alignment key 69 is provided in cooporating recesses 70 and 71 so that there may be a correct alignment as between member 59 stationary contact holder 72 is made of insulated material and includes the fixed button contacts shown.

Of importance is the fact that the glass rod 60 is fixed as by epoxy to the glass rod cap 73.

In returning to FIG. 2, it is seen that the glass rod is wrapped in a series of turns about the reel 21, and the end of such glass rod at E will pass through aperture 75 on to guide rod 16' welded between ring 17 and the peripheral lip of member 11.

FIG. 4 illustrates structures similar to FIG. 3, and which will not be cited in detail, other than simply being described as a rod connection structure S that accommodates direct connection to a suitable probe 75. Probe 75 may be a standard shelf item, as for example a gaseous leak probe manufactured by the Hewlett Packard Corporation for the purpose of detecting leaks in telephone lines. The art is well known in the running of municipal telephone lines underground, that telephone companies will seal off compartments containing runs and provide a certain gas that can be detected in the event of some telephone cable casing leakage. This is standard. Of course, there are many types of probes, electrical, electronic, and otherwise that can be utilized for any one of a number of purposes.

Additionally, the work end or member, such as probe 75, may likewise simply comprise any suitable connection between two electrical leads as is contained in the glass rod so that there may be a completed circuit for heating purposes, by way of example. Thus, the cable can comprise a heating-type table to be used in the oil field industry for heating crude oil in the field lines. Also, such a cable may be used to keep the interior of water lines warm so that water will flow during winter time use. Thus, it is seen that there are any one of a number of applications for the glass rod.

Returning to the glass rod itself, the same by way of example may comprise a one-fourth inch diameter rod which is comprised, for example, of a series such as 74 glass rovings R1 which are saturated, i.e. impregnated in polyester resin R1 and pulled through an appropriate die. In the present instance the rod in its construction may contain either insulated or non-insulated electrical wires, or leads such as those indicated at 47 and 48 in FIG. 3. Likewise, the resin used may be either fireproof or non-fireproof.

Thus, it is seen that, whatever the work end of the glass rod as at probe 75, that is, whether the same comprises an electrical connection, a probe of one of several types, a hook or other engagement means, or whatever, the present invention provides a glass cable system which by its resiliency and strength will be ideally suited for performing a number of operations including pushing, pulling, transmitting electrical current, fishing for wires, "fishing" duct, and so forth. Additionally, the reel supplies a highly useful storage means for storing very long lengths of glass rod.

In assembly, the glass rod will be routed through the glass rod guide at aperture A and can be easily wound upon the drum or reel 21. Preliminary to the winding, of course, the end of the cord will be disposed through an aperture B in the reel such that the end thereof may be connected by electrical means as at 49 to the two electrical brushes. Subsequent to the connection the reel handle is simply revolved continuously so that the entire length of the glass rod may be wound upon the reel in a rolled form. Electrical leads 39 and 40 are connected to plug P which in turn may be connected to an electrical source, to suitable measuring or scientific instruments, and so forth.

The stationary structure including member 16, 16', the reinforcing ribs 12, ring 17 and side member 11, provide a secure mount for the reel structure, this by providing the fixed shaft 14. Shaft 14 likewise may be provided with a washer W and a holding nut N to keep the reel 21 in position.

The present invention contemplates not only the storage structure of the glass rod but also the glass rod itself where the same contains electrical leads 61 and 62, either insulated or non-insulated. The drum, of course, may be used for storing the glass rod whether the latter includes spaced electrical leads or not. In the place of electrical lead incorporation, the glass may itself comprise the insulation material between the respective leads. This can be conveniently formed in a conventional "glass" rod manufacturing process by merely spacing the leads apart while the rovings are urged together and the resin system forced therein.

While particular embodiments of the present invention have been shown and described, it will be obvious to those skilled in the art that changes and modifications may be made without departing from this invention at its broader aspects and, therefore, the aim in the appended claims is to cover all such modifications as fall within the true spirit and scope of the present invention.

I claim:

1. A reel construction including, in combination, a support frame having a horizontal, fixed, hollow shaft; a reel; bearing means journalling said reel to said fixed shaft; a handle eccentrically connected to said reel; a flexible glass-rod type elongate member wrapped upon said reel and having a connection end passing inwardly through said reel to be disposed in the interior thereof; and means proceeding axially through and then radially through said shaft for connecting to said flexible elongate member at a region within said reel.

2. The structure of claim 1 wherein said flexible elongate member comprises a die-compressed, resin-impregnated, glass roving rod.

3. The structure of claim 1 wherein said reel includes outwardly extending fingers, said support frame including fixed arcuate peripheral structure disposed outside of and in proximity with said fingers.

4. The structure of claim 3 wherein said flexible elongate member comprises a die-compressed, resin-impregnated, glass-roving rod.

5. A reel construction including, in combination, a support frame having a horizontal, fixed, hollow shaft; a reel; bearing means journalling said reel to said fixed shaft; a handle eccentrically connected to said reel; a flexible, elongate member wrapped upon said reel; means proceeding axially through and then radially through said shaft for connecting to said flexible elongate member, and wherein said reel comprises a pair of disc-shaped sides and a cylindrical member axially secured therebetween and spaced concentrically from said shaft, said cylindrical member including an access aperture admitting an end of said flexible elongate member, said flexible elongate member including a pair of mutually spaced, embedded electrical leads, said connecting means comprising a pair of electrical contact rings spacedly disposed on said shaft; an electric cord routed through said shaft and electrically connected to said rings, and electrical brush means secured to said reel and electrically connected to and between said rings and said spaced electrical leads of said flexible elongate member.

6. The structure of claim 5 wherein said flexible elongate member comprises a roving-resin glass rod.

* * * * *